(12) United States Patent
Fan

(10) Patent No.: US 9,877,000 B2
(45) Date of Patent: Jan. 23, 2018

(54) SELF-ADAPTIVE ADJUSTMENT METHOD AND DEVICE OF PROJECTOR, AND COMPUTER STORAGE MEDIUM

(71) Applicant: ZTE CORPORATION, Guangdong (CN)

(72) Inventor: Xia Fan, Guangdong (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 15/524,159

(22) PCT Filed: Mar. 16, 2015

(86) PCT No.: PCT/CN2015/074312
§ 371 (c)(1),
(2) Date: May 3, 2017

(87) PCT Pub. No.: WO2016/070541
PCT Pub. Date: May 12, 2016

(65) Prior Publication Data
US 2017/0324939 A1 Nov. 9, 2017

(30) Foreign Application Priority Data
Nov. 3, 2014 (CN) .......................... 2014 1 0610093

(51) Int. Cl.
*H04N 9/31* (2006.01)
*G06F 3/0484* (2013.01)

(52) U.S. Cl.
CPC .......... *H04N 9/3155* (2013.01); *H04N 9/3179* (2013.01); *G06F 3/04847* (2013.01)

(58) Field of Classification Search
CPC ...................................................... H04N 5/57
(Continued)

(56) References Cited

U.S. PATENT DOCUMENTS 7,929,611 B2 * 4/2011 Tsunekawa ............ H04N 5/145
375/240.01
7,965,342 B2 6/2011 Nobori
(Continued)

FOREIGN PATENT DOCUMENTS

CN 101038719 A 9/2007
CN 102866568 A 1/2013
(Continued)

OTHER PUBLICATIONS

International Search Report dated Aug. 18, 2015 for International Application No. PCT/CN2015/074312, in 2 pages.

*Primary Examiner* — Paulos M Natnael
(74) *Attorney, Agent, or Firm* — Knobbe, Martens, Olson & Bear, LLP

(57) ABSTRACT

Disclosed are a self-adaptive adjustment method and device of a projector, and a computer storage medium. The method includes: acquiring a luminance average value of a current picture, and calculating an absolute value of a difference between the luminance average value and a preset normal luminance average value; simultaneously adjusting the projection luminance and the image luminance if the absolute value is greater than or equal to a first preset threshold value; only continuously adjusting the projection luminance if the absolute value is greater than or equal to a second preset threshold value and less than the first preset threshold value; only adjusting the image luminance if the absolute value is greater than or equal to a third preset threshold value and less than the second preset threshold value; forbidding the luminance adjustment if the absolute value is less than the third preset threshold value.

15 Claims, 3 Drawing Sheets

(58) Field of Classification Search
USPC .................................................. 348/687, 678
See application file for complete search history.

(56) References Cited

U.S. PATENT DOCUMENTS

| | | | |
|---|---|---|---|
| 8,223,163 B2 | 7/2012 | Nobori | |
| 8,947,588 B2* | 2/2015 | Shirakawa | H04N 5/2354 348/234 |
| 9,256,924 B2* | 2/2016 | Watanabe | H04N 5/21 |
| 9,497,385 B2* | 11/2016 | Horii | H04N 5/225 |
| 2006/0215037 A1* | 9/2006 | Tsunekawa | H04N 5/145 348/211.99 |
| 2007/0285574 A1 | 12/2007 | Nobori | |
| 2009/0284544 A1 | 11/2009 | Nobori | |
| 2011/0058718 A1* | 3/2011 | Nakajima | G06T 7/33 382/128 |
| 2011/0069203 A1* | 3/2011 | Kobayashi | H04N 5/205 348/234 |
| 2012/0070084 A1* | 3/2012 | Yu | G06T 5/009 382/170 |
| 2013/0083248 A1* | 4/2013 | Suzuki | G06T 5/40 348/678 |
| 2014/0119602 A1* | 5/2014 | Zuo | G06T 7/2033 382/103 |
| 2014/0184738 A1* | 7/2014 | Tomioka | H04N 13/0018 348/42 |
| 2014/0320934 A1* | 10/2014 | Muraishi | H04N 1/38 358/453 |
| 2016/0028965 A1* | 1/2016 | Horii | H04N 5/225 348/333.01 |
| 2016/0379363 A1* | 12/2016 | Kitamura | G06F 17/30799 600/371 |

FOREIGN PATENT DOCUMENTS

| | | |
|---|---|---|
| JP | 2004212311 A | 7/2004 |
| JP | 2006023400 A | 1/2006 |

* cited by examiner

SELF-ADAPTIVE ADJUSTMENT METHOD AND DEVICE OF PROJECTOR, AND COMPUTER STORAGE MEDIUM

CROSS REFERENCE TO RELATED APPLICATIONS

This application is the U.S. National Phase Application under 35 U.S.C. §371 of International Application No. PCT/CN2015/074312, filed Mar. 16, 2015, designating the U.S. and published as WO 2016/070541 A1 on May 12, 2016, which claims the benefit of Chinese Patent Application No. 201410610093.X, filed Nov. 3, 2014, which are hereby incorporated by reference in their entirety.

TECHNICAL FIELD

The present disclosure relates to the field of computers, and in particular relates to a self-adaptive adjustment method and device of a projector, and a computer storage medium.

BACKGROUND

In an existing art, an intelligent micro projection product may also become an intelligent micro projector, which refers to a projector having a new wireless fidelity (WIFI) Internet access function and carrying an intelligent operating system. An Android system is the intelligent operating system which is widely applied to this series of products at present. The intelligent micro projection product supports multi-screen interaction, can be interconnected and shared with Android mobile phones, Android Pad, iPhone, iPad and the like, supports a one-key hot-spot wireless access point (AP) and direct connection of WIFI, has multiple USB interfaces, supports a USB keyboard, a mouse and the like, and has the characteristics of small volume, easy operation, multiple functions, multiple supports, portability and the like. At present, the intelligent projection technology is under continuous progress, and the function is continuously improved.

The luminance adjustment of a projection effect involves two aspects, i.e. image luminance and projection luminance. The projection luminance of an existing projection product is changed by adjusting the current of a light emitting diode (LED) lamp in the projector and by further adjusting the power. However, if the power is increased, the power consumption is certainly increased, and the duration of a battery is reduced; and if the power is decreased, the power consumption can be reduced, but an image may be displayed unclearly. Most of current projection products generally adopt a manual adjustment manner or an automatic adjustment manner according to light sensation. The manual adjustment manner is troublesome and wastes time and labor; and the automatic adjustment manner according to the light sensation is useless because the luminance in a particular environment is fixed.

Furthermore, in a particular scene, how to automatically adjust the luminance of a screen and how to make a user see a clearer image are problems to be solved. In a use process of the projector, the user may have some specific requirements for different pictures. If the pictures are relatively dark, the user may hope the pictures to be brighter and clearer, so that some details can be clearly seen, such as a series of dark pictures photographed by public security officers at dark places when in criminal investigation, The user may hope some pictures to be darker, if the pictures are bright, and the projector is relatively bright in the current scene, eyes of the user will be uncomfortable when looking at the pictures; and sometimes, although the pictures are moderate in luminance, the overall picture luminance is homogeneous, and various objects cannot be clearly distinguished, so that a contrast needs to be adjusted at the moment.

However, the existing projector cannot adjust the contrast. If the projector can perform the self-adaptive adjustment for information such as the luminance or the contrast and the like, can adjust the pictures that are too bright to be little dark and adjust the pictures that are too dark to be little bright, and also can improve the contrast and definition of the image and improve the picture quality, a better user experience can be achieved in this way.

SUMMARY

In view of problems of a projector in the existing art that a projection product is relatively poor in projection effect, cannot clearly display and is complex in operation in an application process due to automatic luminance adjustment according to the light sensation or manual luminance adjustment, embodiments of the present disclosure are desired to provide a self-adaptive adjustment method and device of a projector, and a computer storage medium.

In order to achieve the above objective, a technical solution of embodiments of the present disclosure is realized as follows.

Embodiments of the present disclosure provide a self-adaptive adjustment method of a projector. The method includes:

acquiring a luminance average value of a current picture when a user selects to perform luminance adjustment, and calculating an absolute value of a difference between the luminance average value and a preset normal luminance average value;

simultaneously adjusting the projection luminance and the image luminance if the absolute value is greater than or equal to a first preset threshold value; only continuously adjusting the projection luminance if the absolute value is greater than or equal to a second preset threshold value and less than the first preset threshold value; only adjusting the image luminance if the absolute value is greater than or equal to a third preset threshold value and less than the second preset threshold value; and forbidding the luminance adjustment if the absolute value is less than the third preset threshold value;

sending the self-adaptively-adjusted picture data to a projection module to perform projection.

Prior to the acquiring the luminance average value of the current picture, and calculating the absolute value of the difference between the luminance average value and the preset normal luminance average value, the method may further includes:

opening a self-adaptive adjustment function of the projector according to an operation of the user, and prompting the user to select to perform luminance adjustment and/or contrast adjustment.

Prior to the sending the self-adaptively-adjusted picture data to the projection module to perform projection, the method may further includes:

performing contrast adjustment of the projector after the luminance adjustment of the projector is performed when the user selects to perform the luminance adjustment and the contrast adjustment.

Prior to the sending the self-adaptively-adjusted picture data to the projection module to perform projection, the method may further includes:

directly performing contrast adjustment of the projector when the user only selects to perform the contrast adjustment.

The adjusting the projection luminance and/or image luminance may specifically includes:

confirming that the luminance is too high, and performing a dimming operation when the difference between the luminance average value and the preset normal luminance average value is positive;

confirming that the luminance is too low, and performing a brightening operation when the difference between the luminance average value and the preset normal luminance average value is negative.

Embodiments of the present disclosure further provide a computer storage medium storing a computer program for executing the aforementioned self-adaptive adjustment method of a projector.

Embodiments of the present disclosure further provide a self-adaptive adjustment device of a projector. The device includes a computing module, an adjusting module and a sending module; where the computing module is configured to acquire a luminance average value of a current picture when a user selects to perform luminance adjustment, and calculate an absolute value of a difference between the luminance average value and a preset normal luminance average value;

the adjusting module is configured to simultaneously adjust the projection luminance and the image luminance if the absolute value is greater than or equal to a first preset threshold value; only continuously adjust the projection luminance if the absolute value is greater than or equal to a second preset threshold value and less than the first preset threshold value; only adjust the image luminance if the absolute value is greater than or equal to a third preset threshold value and less than the second preset threshold value; and forbid the luminance adjustment if the absolute value is less than the third preset threshold value;

the sending module is configured to send the self-adaptively-adjusted picture data to a projection module to perform projection.

The device may further includes:

a setting module, configured to open a self-adaptive adjustment function of the projector according to an operation of the user, and prompt the user to select to perform luminance adjustment and/or contrast adjustment before the computing module acquires the luminance average value of the current picture and calculates the absolute value of the difference between the luminance average value and the preset normal luminance average value.

The adjusting module may be further configured to:

perform contrast adjustment of the projector after the luminance adjustment of the projector is performed when the user selects to perform the luminance adjustment and the contrast adjustment before the sending module sends the self-adaptively-adjusted picture data to the projection module to perform projection.

The adjusting module may be further configured to:

directly performing contrast adjustment of the projector when the user only selects to perform the contrast adjustment before the sending module sends the self-adaptively-adjusted picture data to the projection module to perform projection.

The adjusting module may specifically configured to:

confirm that the luminance is too high, and perform a dimming operation when the difference between the luminance average value and the preset normal luminance average value is positive;

confirm that the luminance is too low, and perform a brightening operation when the difference between the luminance average value and the preset normal luminance average value is negative.

By adopting the technical solution of embodiments of the present disclosure, the problems of the projector in the existing art that the projection product is relatively poor in projection effect, cannot clearly display the picture and is complex in operation in the application process due to automatic luminance adjustment according to the light sensation or manual luminance adjustment are solved, the projection effect of a specific picture in the projector can be automatically adjusted, including the automatic adjustment of the projection luminance and the adjustment of the picture luminance, so that the user experience when the projector is used and the picture quality is bad is improved.

The above description is only a summary of the technical solution of the present disclosure. In order to more clearly understand a technical means of the present disclosure and to implement the technical means according to the content of the description, and in order to make the above and other objectives, features and advantages of the present disclosure more apparent and understandable, specific embodiments of the present disclosure are described below.

BRIEF DESCRIPTION OF DRAWINGS

By reading the detailed descriptions of the embodiments below, various other advantages and benefits are apparent for those ordinary skilled in the art. The drawings are only used to illustrate the objective of the embodiments rather than limiting the present disclosure. In all drawings, identical reference numerals indicate identical components. In the drawings.

DETAILED DESCRIPTION

Figure 1:
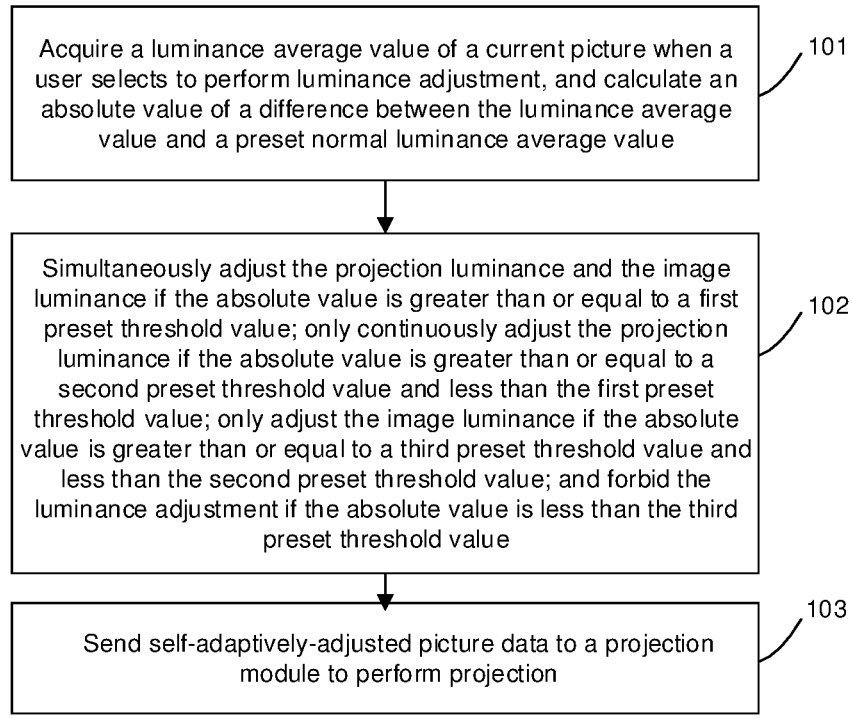
FIG. 1 is a flow chart illustrating a self-adaptive adjustment method of a projector provided by embodiments of the present disclosure.

Exemplary embodiments of the present disclosure are described below in detail with reference to the drawings. Although the exemplary embodiments of the present disclosure are shown in the drawings, it shall be appreciated that the present disclosure can be realized in various forms and shall not be limited by embodiments described herein. On the contrary, these embodiments are provided to more thoroughly understand the present disclosure and to completely convey the scope of the present disclosure to those skilled in the art.

In order to solve the problems of the projector in the existing art that the projection product is relatively poor in projection effect, cannot clearly display and is complex in operation in the application process due to the automatic luminance adjustment according to the light sensation or the manual luminance adjustment, the present disclosure provides a self-adaptive adjustment method and device of a projector, and a computer storage medium, so that three aspects, i.e. the projection luminance, the image luminance and the image contrast can be selected and self-adaptively adjusted. The present disclosure is further described below in detail in combination with the drawings and embodiments. It should be understood that specific embodiments described herein are only used to explain the present disclosure rather than limiting the present disclosure.

Method Embodiments

According to embodiments of the present disclosure, a self-adaptive adjustment method of a projector is provided. FIG. 1 is a flow chart illustrating a self-adaptive adjustment method of a projector provided by embodiments of the present disclosure. As shown in FIG. 1, the self-adaptive adjustment method of a projector of embodiments of the present disclosure mainly includes the following processing.

In step 101, a luminance average value of a current picture when a user selects to perform luminance adjustment is acquired, and an absolute value of a difference between the luminance average value and a preset normal luminance average value is calculated.

In embodiments of the present disclosure, prior to step 101, the following processing may also be carried out.

A self-adaptive adjustment function of a projector is opened according to an operation of the user, and the user is prompted to select to perform luminance adjustment and/or contrast adjustment;

a contrast of the projector is adjusted after the luminance of the projector is adjusted when the user selects to perform luminance adjustment and the contrast adjustment; and the contrast of the projector is directly adjusted when the user only selects to perform the contrast adjustment.

In step 102, if the absolute value is greater than or equal to a first preset threshold value, the projection luminance and the image luminance are simultaneously adjusted; if the absolute value is greater than or equal to a second preset threshold value and less than the first preset threshold value, only the projection luminance is continuously adjusted; if the absolute value is greater than or equal to a third preset threshold value and less than the second preset threshold value, only the image luminance is adjusted; and if the absolute value is less than the third preset threshold value, the luminance adjustment is forbidden.

In step 102, the adjustment of the projection luminance and/or image luminance specifically includes:

the luminance is confirmed to be too high, and a dimming operation is performed when the difference between the luminance average value and the preset normal luminance average value is positive; and the luminance is confirmed to be too low, and a brightening operation is performed when the difference between the luminance average value and the preset normal luminance average value is negative.

The specific dimming operation, the brightening operation and an adjusted amplitude can be determined according to a real situation.

In step 103, self-adaptively-adjusted picture data is sent to a projection module to perform projection.

The above technical solution of embodiments of the present disclosure is described below in detail in combination with the drawings.

When the user utilizes the projector to perform projection, whether an image processing function (i.e. the above self-adaptive adjustment function) needs to be opened can be selected at a setting module according to an application scene; if the user does not perform the setting in advance, when the user starts using the projector, the setting module may prompt the user whether to open the this function; if the user does not select this function, a No option can be selected, and a dialog box can be closed; if the user selects to open this function, the user can further select the image luminance adjustment, the contrast adjustment or both of the image luminance adjustment and the contrast adjustment for a picture; and if the user selects to open this function, picture data is correspondingly self-adaptively adjusted before being converted to a high definition multimedia interface (HDMI) signal.

Figure 2:
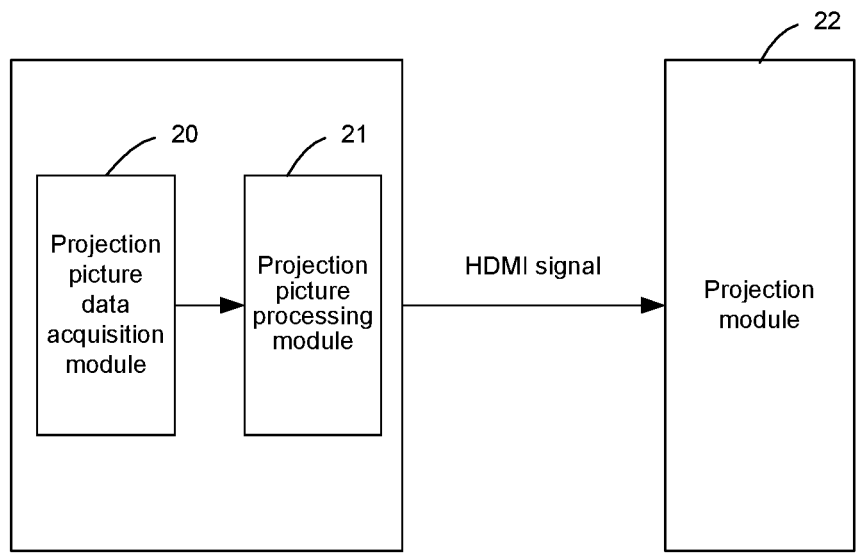
FIG. 2 is a schematic structural diagram illustrating a self-adaptive adjustment method of a projector provided by embodiments of the present disclosure.

FIG. 2 is a schematic structural diagram illustrating the self-adaptive adjustment method of a projector provided by embodiments of the present disclosure. As shown in FIG. 2, the schematic structural diagram of the self-adaptive adjustment method of a projector includes a projection picture data acquisition module 20, a projection picture processing module 21 and a projection module 22; the projection picture data acquisition module 20 is mainly configured to acquire data of a projection picture; and the projection picture processing module 21 self-adaptively adjusts the acquired data, converts the picture data to an HDMI signal, and sends the HDMI signal to the projection module 22 to perform projection. The self-adaptive adjustment of the acquired data performed by the projection picture processing module 21 is described below in detail.

Specifically, when the user selects to perform luminance adjustment, a normal average luminance value is set as A, and threshold values X1, X2 and X3 (corresponding to the first preset threshold value, the second preset threshold value and the third preset threshold value described above) are set. When the projection picture processing module 21 detects that an absolute value of a difference between an average luminance value of a current picture and A is greater than or equal to X1, the current picture is considered to be too dark, the projection luminance and the image luminance may be simultaneously adjusted at the moment, the projection luminance is first adjusted, and then the image luminance is adjusted; when the difference is positive, the luminance is considered to be too high, a dimming operation is needed; and if the difference is negative, the luminance is considered to be too low, a brightening operation is needed.

If detecting that the absolute value of the difference between the average luminance value of the current picture and A is greater than or equal to X2 and less than X1, only the projection luminance needs to be adjusted; similarly, when the difference is positive, the luminance is considered to be too high, the dimming operation is needed; and if the difference is negative, the luminance is considered to be too low, the brightening operation is needed.

If detecting that the absolute value of the difference between the average luminance value of the current picture and A is greater than or equal to X3 and less than X2, fine adjustment is carried out only by simply adjusting the image luminance; similarly, when the difference is positive, the luminance is considered to be too high, so that the dimming operation is needed; if the different is negative, the luminance is considered to be too low, so that the brightening operation is needed.

If detecting that the absolute value of the difference between the average luminance value of the current picture and A is less than X3, no adjustment is performed.

When the user selects to perform the contrast adjustment, the contrast is adjusted in the case of keeping the luminance of the current picture unchanged, so that the picture quality is clearer and sharper.

The technical solution of embodiments of the present disclosure is carried out by employing a method of first adjusting the luminance and then adjusting the contrast.

In the practical application, the user selects to open a projection function in a Sink application; the Sink application first checks whether the projection module 22 is opened, and opens the projection module if the projection module is not opened; after the projection module 22 is opened, the Sink application informs the system of being in a projection mode at present; the Sink application pops up a setting menu which is used for the user to select whether to perform the self-adaptive processing before the projection, including two options, i.e. luminance processing and contrast processing. The setting menu is closed after the selection of the user; and if the user selects to perform the luminance processing, the Sink application may perform the image processing operation for data read from a buffer at a bottom layer. The current of a light emitting diode (LED) of the projector is adjusted or the luminance of the image of an original picture is adjusted according to an image processing result; if the user selects to perform the contrast adjustment, the Sink application may further perform the contrast processing for the data after the luminance processing; and the processed data is converted to an HDMI signal to be sent to the projection module, so that the clear display of the picture can be completed.

Figure 3:
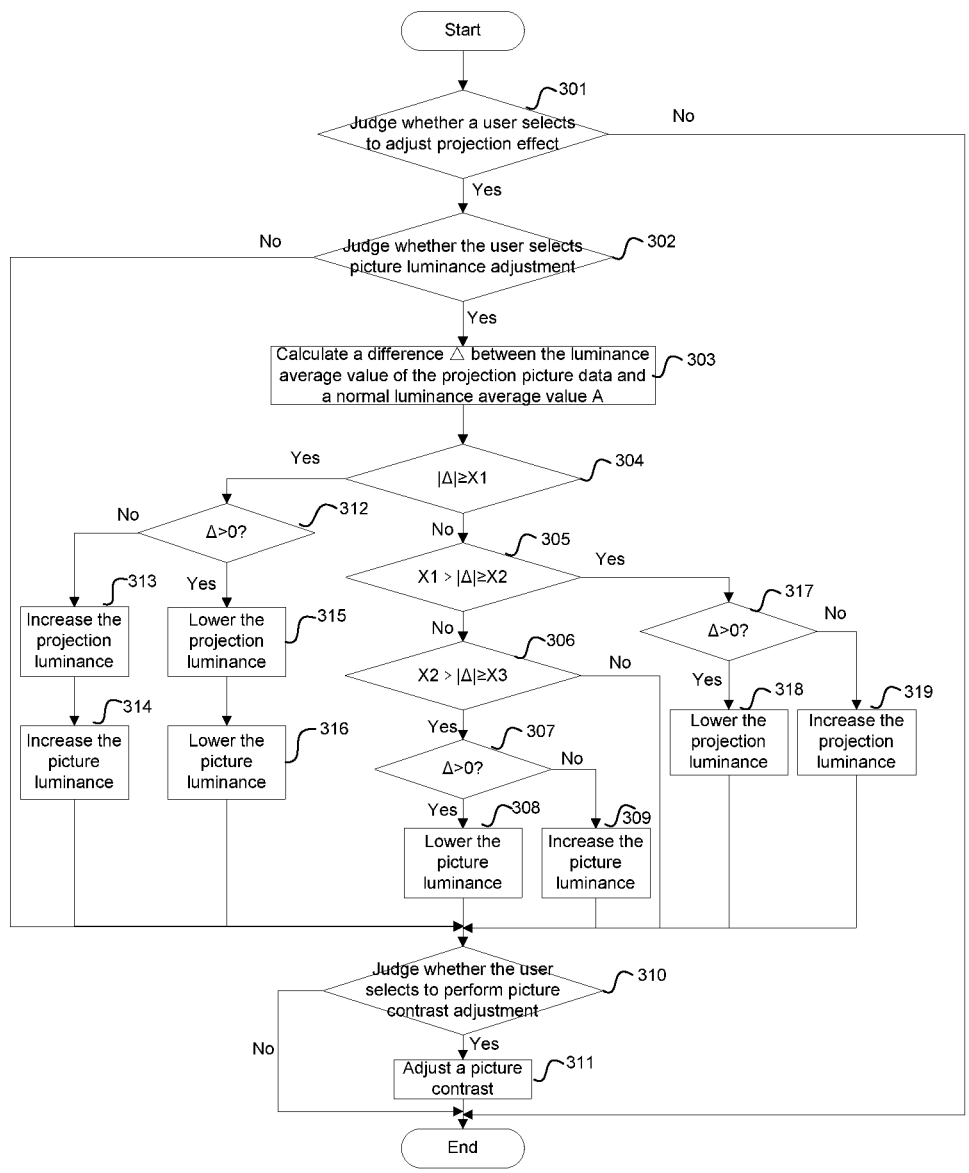
FIG. 3 is a flow chart illustrating detailed processing of a self-adaptive adjustment method of a projector provided by embodiments of the present disclosure.

FIG. 3 is a flow chart illustrating detail processing of the self-adaptive adjustment method of a projector provided by embodiments of the present disclosure. As shown in FIG. 3, the flow mainly includes the following processing.

In step 301, whether the user selects to adjust projection effect is judged, step 302 is executed if yes, and otherwise the operation is ended;

in step 302, whether the user selects to adjust the picture luminance is judged, step 303 is executed if yes; otherwise, step 310 is executed;

in step 303, a difference $\Delta$ between the luminance average value of the projection picture data and the normal luminance average value A is calculated;

in step 304, whether $|\Delta| \geq XI$ is true is judged, step 312 is executed if yes;

otherwise, step 305 is executed;

in step 305, whether $X1 > |\Delta| \geq X2$ is true is judged, step 317 is executed if yes; otherwise, step 306 is executed;

in step 306, whether $X2 > |\Delta| \geq X3$ is true is judged, step 307 is executed if yes; otherwise, step 310 is executed;

in step 307, whether $\Delta > 0$ is true is judged, step 308 is executed if yes; otherwise, step 309 is executed;

in step 308, the picture luminance is lowered;

in step 309, the picture luminance is increased;

in step 310, whether the user selects to adjust a picture contrast is judged, step 311 is executed if yes; otherwise, the operation is ended;

in step 311, the picture contrast is adjusted, and the operation is ended;

in step 312, whether $\Delta > 0$ is true is judged, step 315 is executed if yes; otherwise, step 313 is executed;

in step 313, the projection luminance is increased;

in step 314, the picture luminance is increased, and step 310 is executed;

in step 315, the projection luminance is lowered;

in step 316, the picture luminance is lowered, and step 310 is executed;

in step 317, whether $\Delta > 0$ is true is judged, step 318 is executed if yes; otherwise, step 319 is executed;

in step 318, the projection luminance is lowered, and step 310 is executed; and in step 319, the projection luminance is increased, and step 310 is executed.

In conclusion, by means of the technical solution of embodiments of the present disclosure, the problems of the projector in the existing art that the projection product is relatively poor in projection effect, cannot clearly display the picture and is complex in operation in the application process due to the automatic luminance adjustment according to the light sensation or the manual luminance adjustment are solved, the projection effect of the specific picture in the projector can be automatically adjusted, including the automatic adjustment of the projection luminance, the adjustment of the picture luminance, and the adjustment of the picture contrast, so that the user experience when the projector is used and the picture quality is bad is improved.

Embodiments of the present disclosure further provide a computer storage medium. The computer storage medium stores a computer program, and the computer program is configured to execute the aforementioned self-adaptive adjustment method of a projector shown in FIG. 1 or FIG. 3 in embodiments of the present disclosure.

Device Embodiments

Figure 4:
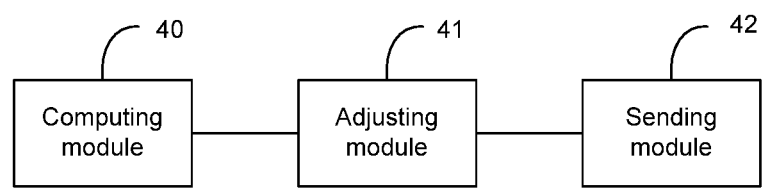
FIG. 4 is a schematic structural diagram illustrating a self-adaptive adjustment device of a projector provided by embodiments of the present disclosure.

According to embodiments of the present disclosure, a self-adaptive adjustment device of a projector is provided. FIG. 4 is a schematic structural diagram illustrating the self-adaptive adjustment device of a projector provided by embodiments of the present disclosure. As shown in FIG. 4, the self-adaptive adjustment device of a projector of embodiments of the present disclosure includes: a computing module 40, an adjusting module 41 and a sending module 42, and each module of embodiments of the present disclosure is described below in detail.

The computing module 40 is configured to acquire a luminance average value of a current picture when a user selects to perform luminance adjustment, and calculate an absolute value of a difference between the luminance average value and a preset normal luminance average value;

the adjusting module 41 is configured to simultaneously adjust the projection luminance and the image luminance if the absolute value is greater than or equal to a first preset threshold value; only continuously adjust the projection luminance if the absolute value is greater than or equal to a second preset threshold value and less than the first preset threshold value; only adjust the image luminance if the absolute value is greater than or equal to a third preset threshold value and less than the second preset threshold value; and forbid the luminance adjustment if the absolute value is less than the third preset threshold value; and the sending module 42 is configured to send the self-adaptively-adjusted picture data to a projection module to perform projection.

The self-adaptive adjustment device of a projector provided by embodiments of the present disclosure may further include:

a setting module, configured to open a self-adaptive adjustment function of a projector according to an operation of the user, and prompt the user to select the luminance adjustment and/or contrast adjustment before the computing module 40 acquires the luminance average value of the current picture and calculates the absolute value of the difference between the luminance average value and the preset normal luminance average value.

The adjusting module 41 may be further configured to:

adjust a contrast of the projector after the luminance of the projector is adjusted when the user selects to perform luminance adjustment and the contrast adjustment before the sending module 42 sends the self-adaptively-adjusted picture data to the projection module to perform projection; and directly adjust the contrast of the projector when the user only selects to perform the contrast adjustment before the sending module 42 sends the self-adaptively-adjusted picture data to the projection module to perform projection.

The adjusting module 41 may be specifically configured to: confirm that the luminance is too high and perform the dimming operation when the difference between the luminance average value and the preset normal luminance average value is negative; and confirm that the luminance is too low and perform the bright increasing operation when the difference between the luminance average value and the preset normal luminance average value is negative.

In the practical application, the above self-adaptive adjustment device of a projector may be applied to the field of projection. The computing module 40, the adjusting module 41 and the sending module 42 may be realized by the self-adaptive adjustment device of a projector or a central processor, a digital signal processor (DSP) or a field programmable gate array (FPGA) of a device to which the self-adaptive adjustment device of a projector belongs.

By means of the technical solution of embodiments of the present disclosure, the problems of the projector in the existing art that the projection product is relatively poor in projection effect, cannot clearly display the picture and is complex in operation in the application process due to the automatic luminance adjustment according to the light sensation or the manual luminance adjustment are solved, the projection effect of the specific picture in the projector can be automatically adjusted, including the automatic adjustment of the projection luminance, the adjustment of the picture luminance, and the adjustment of the picture contrast, so that the user experience when the projector is used and the picture quality is bad is improved.

It will be apparent to those skilled in the art that various modifications and variations can be made to the present disclosure without departing from the spirit and scope of the present disclosure. In this way, the present disclosure is intended to include modifications and variations if the modifications and variations of the present disclosure are within the scope of the claims and the equivalents thereof.

Algorithms and displays provided herein are not inherently related to any specific computer, virtual system or other devices. Various general-purpose systems may also be used together with the teachings based on this. According to the above description, the structure required for constructing the system is apparent. Furthermore, the present disclosure is not directed to any particular programming language. It shall be understood that the content of the present disclosure described herein in various programming languages and the above description made for the particular language are intended to disclose optimal embodiments of the present disclosure.

A great number of specific details are explained in the description provided herein. However, it can be appreciated that embodiments of the present disclosure may be implemented without specific details. In some examples, the well-known methods, structures and technologies are not illustrated in detail so as not to obscure the understanding of the present description.

Similarly, it shall be understood that in order to simplify the present disclosure and help to understand one or more of various inventive aspects, in the above description of the exemplary embodiments of the present disclosure, various features of the present disclosure may be collectively grouped into a single embodiment, drawing or description thereof. However, the disclosed method shall not be interpreted as reflecting the following intention: the claimed disclosure claims more features than those definitely described in each of the claims. More specifically, as reflected in the following claims, the inventive aspect is fewer than all the features of the previously disclosed single embodiment. Accordingly, the claims that follow the specific embodiments are expressly incorporated into this specific embodiment, and each claim is served as a separate embodiment of the present disclosure.

Those skilled in the art can appreciate that the modules in the client in embodiments can be self-adaptively changed and can be arranged into one or more clients different from the embodiments. The modules in embodiments can be combined into one module and can be further divided into a plurality of sub-modules or subunits or sub-assemblies. All features disclosed in the present description (including the accompanying claims, abstract and drawings) and any of the methods disclosed herein or all processes or units of the client may be employed in any combination, except that such features and/or at least some of the processes or units are mutually exclusive. Unless otherwise expressly stated, each feature disclosed in the present description (including the accompanying claims, abstract and drawings) may be replaced by alternative features that provide the same, equivalent or similar objective.

Furthermore, those skilled in the art can appreciate that although some of the embodiments described herein include certain features included in other embodiments rather than other features, combinations of features of different embodiments are meant to be within the scope of the present disclosure and form different embodiments. For example, in the claims below, any of claimed embodiments can be used in any combination manner.

Various component embodiments of the present disclosure may be realized in hardware or realized in software modules running on one or more processors or realized in combinations thereof. Those skilled in the art shall appreciate that some or all functions of some or all components in the client with a sequencing website according to embodiments of the present disclosure may be realized by using a microprocessor or the digital signal processor (DSP) in practice. The present disclosure may also be realized as a part or all of devices or device programs (such as a computer program and a computer program product) for executing the method described herein. The program for realizing the present disclosure may be stored on the computer readable medium or may have one or more signal forms. The signal may be downloaded from an Internet website or provided on a carrier signal or provided in any other forms.

It shall be noted that the above embodiments are used to describe the present disclosure rather than limiting the present disclosure. Moreover, those skilled in the art can design alternative embodiments without departing from the scope of the claims. In the claims, any reference numerals disposed in brackets shall not be constructed as the limitation to the claims. The word "include" refers to that elements or steps that are not listed in the claims are not excluded. "A" or "one" disposed in front of an element refers to that the existence of a plurality of such elements is not excluded. The present disclosure may be realized by means of hardware including a plurality of different elements and by means of the appropriately-programmed computer. In the unit claims listing a plurality of devices, a plurality of these devices may be specifically realized through a same hardware item. The use of the words "first", "second", "third" and the like does not indicate any order. These words can be interpreted as names.

INDUSTRIAL APPLICABILITY

In embodiments of the present disclosure, when the user selects to perform luminance adjustment, the luminance average value of the current picture is acquired, and the absolute value of the difference between the luminance average value and the preset normal luminance average value is calculated; the absolute value is compared with the preset threshold value, and the projection luminance and/or the image luminance is adjusted according to a comparison result; self-adaptively-adjusted picture data is sent to a projection module to perform projection; and therefore, the projection effect of a specific picture in the projector can be automatically adjusted, thereby improving the user experience when the projector is used and the picture quality is bad.

What is claimed is:

1. A self-adaptive adjustment method of a projector, comprising:
    acquiring a luminance average value of a current picture when a user selects a luminance adjustment;
    calculating an absolute value of a difference between the luminance average value and a preset normal luminance average value;
    simultaneously adjusting a projection luminance and an image luminance if the absolute value of the difference is greater than or equal to a first preset threshold value;
    continuously adjusting the projection luminance if the absolute value of the difference is greater than or equal to a second preset threshold value and less than the first preset threshold value;
    adjusting the image luminance if the absolute value of the difference is greater than or equal to a third preset threshold value and less than the second preset threshold value;
    not adjusting the luminance adjustment if the absolute value of the difference is less than the third preset threshold value; and
    sending self-adaptively-adjusted picture data to a projection module to perform projection.

2. The method according to claim 1, further comprising, prior to acquiring the luminance average value of the current picture and calculating the absolute value of the difference between the luminance average value and the preset normal luminance average value:
    opening a self-adaptive adjustment application of the projector according to an operation of the user, and prompting the user to select the luminance adjustment and/or a contrast adjustment.

3. The method according to claim 2, further comprising, prior to sending the self-adaptively-adjusted picture data to the projection module to perform projection:
    performing the contrast adjustment of the projector after performing the luminance adjustment of the projector when the user selects the luminance adjustment and the contrast adjustment.

4. The method according to claim 2, further comprising, prior to sending the self-adaptively-adjusted picture data to the projection module to perform projection:
    directly performing the contrast adjustment of the projector when the user selects the contrast adjustment.

5. The method according to claim 1, wherein adjusting the projection luminance and/or the image luminance comprises:
    determining whether the luminance is above a first threshold, and performing a dimming operation when the difference between the luminance average value and the preset normal luminance average value is positive;
    determining whether the luminance is below a second threshold, and performing a brightening operation when the difference between the luminance average value and the preset normal luminance average value is negative.

6. A self-adaptive adjustment device of a projector, comprising:
    a computing module configured to acquire a luminance average value of a current picture when a user selects a luminance adjustment and calculate an absolute value of a difference between the luminance average value and a preset normal luminance average value;
    an adjusting module configured to:
        simultaneously adjust a projection luminance and an image luminance if the absolute value of the difference is greater than or equal to a first preset threshold value;
        continuously adjust the projection luminance if the absolute value of the difference is greater than or equal to a second preset threshold value and less than the first preset threshold value;
        adjust the image luminance if the absolute value of the difference is greater than or equal to a third preset threshold value and less than the second preset threshold value; and
        not adjust the luminance adjustment if the absolute value of the difference is less than the third preset threshold value; and
    a sending module configured to send self-adaptively-adjusted picture data to a projection module to perform projection.

7. The device according to claim 6, further comprising:
    a setting module configured to open a self-adaptive adjustment application of the projector according to an operation of the user, and prompt the user to select a luminance adjustment and/or contrast adjustment before the computing module acquires the luminance average value of the current picture and calculates the absolute value of the difference between the luminance average value and the preset normal luminance average value.

8. The device according to claim 7, wherein the adjusting module is further configured to:
    perform contrast adjustment of the projector after the luminance adjustment of the projector is performed when the user selects the luminance adjustment and the contrast adjustment before the sending module sends the self-adaptively-adjusted picture data to the projection module to perform projection.

9. The device according to claim 7, wherein the adjusting module is further configured to:
    directly perform the contrast adjustment of the projector when the user selects the contrast adjustment before the sending module sends the self-adaptively-adjusted picture data to the projection module to perform projection.

10. The device according to claim 6, wherein the adjusting module is further configured to:

determine whether the luminance is above a first threshold and perform a dimming operation when the difference between the luminance average value and the preset normal luminance average value is positive;

determine whether the luminance is below a second threshold and perform a brightening operation when the difference between the luminance average value and the preset normal luminance average value is negative.

11. A computer storage medium storing a-computer executable instructions that, when executed by an electronic device comprising a processor, cause the processor to:

acquire a luminance average value of a current picture when a user selects luminance adjustment;

calculate an absolute value of a difference between the luminance average value and a preset normal luminance average value;

simultaneously adjust a projection luminance and an image luminance if the absolute value of the difference is greater than or equal to a first preset threshold value;

adjust the projection luminance if the absolute value of the difference is greater than or equal to a second preset threshold value and less than the first preset threshold value;

adjust the image luminance if the absolute value of the difference is greater than or equal to a third preset threshold value and less than the second preset threshold value;

not adjust the projection luminance or the image luminance if the absolute value of the difference is less than the third preset threshold value; and send self-adaptively-adjusted picture data to a projection module to perform projection.

12. The computer storage medium according to claim 11, wherein the instructions are further configured to cause the processor to, prior to the acquiring the luminance average value of the current picture and calculating the absolute value of the difference between the luminance average value and the preset normal luminance average value:

open a self-adaptive adjustment application of a projector according to an operation of the user, and prompt the user to select a luminance adjustment and/or contrast adjustment.

13. The computer storage medium according to claim 12, wherein the instructions are further configured to cause the processor to, prior to the sending the self-adaptively-adjusted picture data to the projection module to perform projection:

perform the contrast adjustment of the projector after the luminance adjustment of the projector is performed when the user selects the luminance adjustment and the contrast adjustment.

14. The computer storage medium according to claim 12, wherein the instructions are further configured to cause the processor to, prior to the sending the self-adaptively-adjusted picture data to the projection module to perform projection:

directly perform the contrast adjustment of the projector when the user selects the contrast adjustment.

15. The computer storage medium according to claim 11, wherein the instructions are further configured to cause the processor to, when adjusting the projection luminance and/or the image luminance:

determine whether the luminance is above a first threshold, and perform a dimming operation when the difference between the luminance average value and the preset normal luminance average value is positive;

determine whether the luminance is below a second threshold, and perform a brightening operation when the difference between the luminance average value and the preset normal luminance average value is negative.

* * * * *